(12) United States Patent
Coenen et al.

(10) Patent No.: US 11,523,167 B2
(45) Date of Patent: Dec. 6, 2022

(54) TELEVISION USER INTERFACE

(71) Applicant: SKY CP LIMITED, Isleworth (GB)

(72) Inventors: Rob Coenen, London (GB); Julien Heanley, Manchester (GB)

(73) Assignee: SKY CP LIMITED

( * ) Notice: Subject to any disclaimer, the term of this patent is extended or adjusted under 35 U.S.C. 154(b) by 201 days.

(21) Appl. No.: 16/662,706

(22) Filed: Oct. 24, 2019

(65) Prior Publication Data

US 2020/0145713 A1    May 7, 2020

Related U.S. Application Data

(62) Division of application No. 15/774,544, filed as application No. PCT/GB2016/053492 on Nov. 8, 2016, now abandoned.

(30) Foreign Application Priority Data

Nov. 9, 2015  (GB) .................................... 1519754

(51) Int. Cl.
  *H04N 21/422*  (2011.01)
  *H04N 21/482*  (2011.01)
  (Continued)

(52) U.S. Cl.
  CPC ....... *H04N 21/42224* (2013.01); *G06F 3/038* (2013.01); *G06F 3/03547* (2013.01);
  (Continued)

(58) Field of Classification Search
  None
  See application file for complete search history.

(56) References Cited

U.S. PATENT DOCUMENTS

| | | |
|---|---|---|
| 5,410,326 A | 4/1995 | Goldstein |
| 6,412,110 B1 | 6/2002 | Schein et al. |
| | (Continued) | |

FOREIGN PATENT DOCUMENTS

| | | |
|---|---|---|
| GB | 2525945 A | 11/2015 |
| WO | 96/37996 A1 | 11/1996 |
| | (Continued) | |

OTHER PUBLICATIONS

Communication pursuant to Article 94(3) EPC dated Mar. 29, 2021, from EP Application No. 19 202 786.0-1208, 6 sheets.
(Continued)

*Primary Examiner* — Jason K Lin
(74) *Attorney, Agent, or Firm* — Katten Muchin Rosenman LLP

(57) ABSTRACT

A user interface for a television display includes a remote control with a touch pad. The remote control communicates wirelessly with a receiver. Periodic samples of touch positions are time stamped only when they are received at the receiver, and the time stamps are quantized to the interval of the periodic samples. The response of the user interface to gestures may be determined by a set of cascaded style sheets. Directional gestures may be used to skip forward or backward by a relative time during playback. During EPG scrolling, a position indicator may remain fixed in a horizontal direction until a time boundary of the EPG is reached, at which point the position indicator may move to the end of the time boundary. When scrolling programme items, an item may remain highlighted until it scrolls off the display, at which point the highlighting disappears until scrolling is complete. During scrolling, multiple directional gestures may be used to increase speed of scrolling. A swipe and hold gesture may be used to control the speed of scrolling, which is dependent on the length of time of the hold.

8 Claims, 16 Drawing Sheets

(51) Int. Cl.

| | | |
|---|---|---|
| *H04N 21/431* | (2011.01) | |
| *G06F 3/038* | (2013.01) | |
| *G06F 3/04842* | (2022.01) | |
| *G06F 3/04812* | (2022.01) | |
| *G06F 3/0354* | (2013.01) | |
| *G06F 3/04883* | (2022.01) | |
| *G06F 40/154* | (2020.01) | |
| *H04N 21/472* | (2011.01) | |

(52) U.S. Cl.
CPC ...... *G06F 3/04812* (2013.01); *G06F 3/04842* (2013.01); *G06F 3/04883* (2013.01); *G06F 40/154* (2020.01); *H04N 21/4312* (2013.01); *H04N 21/4314* (2013.01); *H04N 21/47217* (2013.01); *H04N 21/4821* (2013.01)

(56) References Cited

U.S. PATENT DOCUMENTS

| | | | |
|---|---|---|---|
| 7,483,834 | B2 | 1/2009 | Naimpally et al. |
| 7,546,621 | B2 | 6/2009 | LaJoie |
| 7,886,322 | B2 | 2/2011 | Kamiya |
| 8,438,503 | B2 | 5/2013 | Hatambeiki et al. |
| 8,719,870 | B1 | 5/2014 | Davies et al. |
| 8,839,155 | B2 | 9/2014 | Ording |
| 8,843,858 | B2 | 9/2014 | Devi et al. |
| 8,873,930 | B2 | 10/2014 | Deglise et al. |
| 8,896,765 | B1 | 11/2014 | White et al. |
| 8,963,847 | B2 | 2/2015 | Hunt |
| 9,110,562 | B1 | 8/2015 | Eldawy |
| 9,232,167 | B2 | 1/2016 | Cooke et al. |
| 9,268,424 | B2 | 2/2016 | Hatanaka |
| 9,411,501 | B2 | 8/2016 | Yamamoto et al. |
| 9,547,437 | B2 | 1/2017 | Fino |
| 9,588,677 | B2 | 3/2017 | Relyea |
| 9,767,681 | B2 | 9/2017 | Hope et al. |
| 2003/0105693 | A1 | 6/2003 | Conkwright |
| 2005/0015804 | A1 | 1/2005 | LaJoie |
| 2009/0001532 | A1 | 1/2009 | Shiomi |
| 2009/0119613 | A1 | 5/2009 | Nakaya |
| 2010/0169842 | A1 | 7/2010 | Migos |
| 2010/0171878 | A1 | 7/2010 | VanDuyn |
| 2010/0198822 | A1 | 8/2010 | Glennon |
| 2010/0235794 | A1 | 9/2010 | Ordig |
| 2011/0019105 | A1 | 1/2011 | Austin |
| 2011/0055772 | A1 | 3/2011 | Hatambeiki et al. |
| 2011/0080253 | A1 | 4/2011 | Sakamoto |
| 2011/0142428 | A1 | 6/2011 | Stenberg |
| 2011/0321093 | A1* | 12/2011 | McRae ............ H04N 21/4314 725/40 |
| 2012/0066638 | A1 | 3/2012 | Ohri |
| 2012/0169593 | A1 | 7/2012 | Mak et al. |
| 2013/0007793 | A1 | 1/2013 | Anthru et al. |
| 2013/0322848 | A1 | 12/2013 | Li |
| 2013/0326430 | A1 | 12/2013 | Devi |
| 2014/0035831 | A1 | 2/2014 | Fino |
| 2014/0149922 | A1 | 5/2014 | Hauser |
| 2014/0150026 | A1* | 5/2014 | Mountain .......... H04N 21/4821 725/52 |
| 2014/0189747 | A1* | 7/2014 | Shellman ............ H04N 21/4314 725/52 |
| 2014/0281924 | A1 | 9/2014 | Chipman |
| 2015/0156548 | A1 | 6/2015 | Sirpal et al. |
| 2015/0193138 | A1 | 7/2015 | Relyea et al. |
| 2015/0261730 | A1 | 9/2015 | Rakow |
| 2016/0078006 | A1 | 3/2016 | Straub |

FOREIGN PATENT DOCUMENTS

| | | |
|---|---|---|
| WO | 99/66721 A2 | 12/1999 |
| WO | 03/043320 A2 | 5/2003 |
| WO | 2007/067858 A2 | 11/2006 |
| WO | 2009/050489 A2 | 4/2009 |
| WO | 2011/1865 A1 | 1/2011 |
| WO | 2012/104288 A1 | 8/2012 |

OTHER PUBLICATIONS

Office Action for United Kingdom Patent Application No. GB1714200.1 dated Feb. 28, 2019.
Final Office Action dated Apr. 1, 2021, from U.S. Appl. No. 15/774,544, 30 sheets.
CSS Cursor Examples, Web page <https://esqsoft.com/css-help/css-cursor-examples.htm>, 3 pages, Jul. 7, 2014, retrieved from Internet Archive Wayback Machine <https://web.archive.org/web/20140707200119/https://esqsoft.com/css-help/css-cursor-examples.htm> on Mar. 24, 2021 (Year: 2014).
Non-Final Rejection dated Aug. 6, 2019, from the corresponding U.S. Appl. No. 15/774,544.
Final Rejection dated Nov. 21, 2019, from the corresponding U.S. Appl. No. 15/774,544.
Aoki et al., "Expanding kinds of gestures for hierarchical menu selection by unicursal gesture interface", IEEE Transactions on Consumer Electronics, IEEE Service Center, New York, NY, US, vol. 57, No. 2, May 1, 2011, pp. 731-737.
International Search report for International Application No. PCT/GB2016/053492, dated May 4, 2017.
Non-Final Rejection dated Sep. 9, 2020, from the corresponding U.S. Appl. No. 15/774,544.

* cited by examiner

TELEVISION USER INTERFACE

CROSS REFERENCE TO RELATED APPLICATIONS

This application is a divisional of U.S. patent application Ser. No. 15/774,544, filed May 8, 2018 which is a 371 of International Appln. No. PCT/GB2016053492, filed Nov. 8, 2016 which claims priority from GB 1519754.4, filed Nov. 9, 2015 the contents of all incorporated herein by reference in its entirety.

FIELD OF THE INVENTION

The present invention relates to user interfaces for television displays, and to apparatus, methods and computer programs for implementing such user interfaces, particularly but not exclusively using a remote control.

BACKGROUND OF THE INVENTION

Electronic programme guides (EPGs) provide a user interface for the display of television programmes, such as audio and video programmes, to the user. Interactive EPGs allow the user to select programmes for viewing and/or recording. Examples of known EPGs include those provided with the Sky™ and Sky+™ set-top boxes. Aspects of those EPGs are described in WO-A-96/37996, WO-A-99/66721 and WO-A-2009/050489.

EPGs are typically designed for display on a television (TV) screen, and are therefore limited by the resolution of that screen. With the advent of High Definition TV (HDTV), higher resolution EPGs are possible. However, the number of different channels available continues to increase and the user must typically navigate around the EPG, or filter by search criteria, to find a programme of interest.

It is also desirable to include additional information in an EPG, such as programme notes, and to provide additional functionality, such as Push or Pull Video On Demand (VOD), interactive TV content and user configurable options and preferences, all incorporated within the EPG window.

With this increased amount of information for display, there is a need for an intuitive, easy to use means of navigating large quantities of television programming to find desired programmes. A remote control is typically used to navigate around the EPG and select programmes for viewing. Remote controls currently used for television systems typically comprise a handset including directional keys or buttons for navigation through a menu or EPG. With the advent of larger and more complex EPGs, excessive button pressing is required to select the desired programme or option. More recently, remote controls have been introduced with analog direction controls, such as touch pads and motion sensors; examples are disclosed in WO-A-2012/071334 (Hillcrest Laboratories) and U.S. Pat. No. 6,412,110. However, these analog direction controls are not well integrated with the EPG and do not provide intuitive control for the user. For example, the analog direction controls may control the position of a pointer on the display, but the user may find it difficult to control the position of the pointer and to select the required option.

SUMMARY OF THE INVENTION

Aspects of the invention are defined by the accompanying claims. Embodiments of the invention relate to a user interface for a television display including a remote control with a touch pad. The remote control may communicate wirelessly with a receiver. Periodic samples of touch positions are time stamped only when they are received at the receiver, which can lead to variable latency; to overcome this problem, the time stamps may be quantized to the interval of the periodic samples.

The response of the user interface to gestures may be determined by a set of cascaded style sheets, allowing a consistent look and feel across different parts of the user interface, while allowing modification in specific circumstances.

Directional gestures may be used to skip forward or backward by a relative time during playback. Tis may be more intuitive than selecting an absolute playback point.

During EPG scrolling, a position indicator may remain fixed in a horizontal direction until a time boundary of the EPG is reached, at which point the position indicator may move to the end of the time boundary. This allows the user to focus on a specific part of the display during scrolling.

When scrolling programme items, am item may remain highlighted until it scrolls off the display, at which point the highlighting disappears until scrolling is complete. This avoids rapid flickering or jumping of highlighting during scrolling.

During scrolling, multiple directional gestures may be used to increase speed of scrolling. Alternatively or additionally, a swipe and hold gesture may be used to control the speed of scrolling, which is dependent on the length of time of the hold. These gestures may be more intuitive to the user than controlling scrolling based on speed or acceleration of gestures.

Apparatus and/or a computer program arranged to perform any of the above aspects of the invention may be provided.

BRIEF DESCRIPTION OF THE DRAWINGS

There now follows, by way of example only, a detailed description of preferred embodiments of the present invention in which.

DETAILED DESCRIPTION OF THE EMBODIMENTS

Television Display Apparatus

In this section, a satellite broadcast receiver is described as an example of apparatus on which a television display may be implemented. It is not intended as limiting to the scope of the invention. Other types of television display apparatus may include cable TV or Internet TV (IPTV) apparatus, and the receiver may include a plurality of different types of such apparatus. Additionally, the display apparatus may be any other audio/visual display apparatus, such as a personal computer, configured to receive and display television signals.

Figure 1:
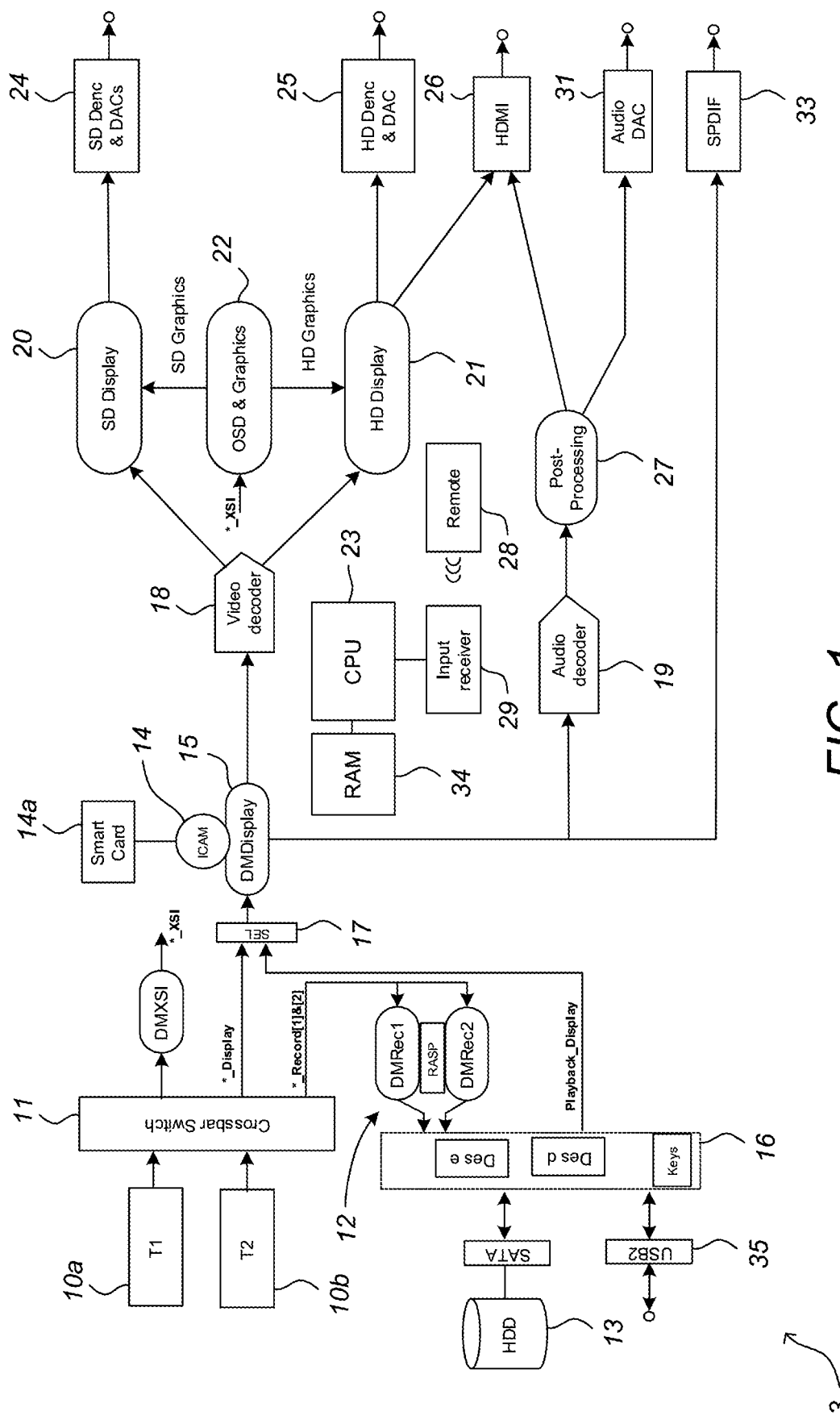
FIG. 1 is a block diagram of the functional components of a satellite broadcast receiver.

FIG. 1 shows a satellite broadcast receiver 3 for receiving television signals from a satellite television broadcast network. In this example, received signals are input to first and second tuners 10a and 10b but any number of tuners may be used in the receiver 3; for example, 8 or 16 different tuners may be provided. The received signals may comprise multiplexed channels. The tuners 10a and 10b are tuneable into the same or different channels of the satellite television broadcast network for simultaneous reception of the same or different television programmes. Signals from the tuners 10a and 10b are passed to a crossbar switch 11 which separates the data received from the tuners 10a and 10b into data for direct output to a television, data representing received television programmes for recording and subsequent playback, and user services and programme scheduling data, in accordance with the XSI standard, for example. The receiver 3 has a hard disk (or other memory medium) 13 which receives from the crossbar switch 11 compressed video and audio data for recording and subsequent playback via recording and playback circuitry 16. In the embodiment illustrated in FIG. 1, the receiver 3 includes two demultiplexer recording pipes (DMRec1 and DMRec2), which are coupled to Random Access Streaming Protocol circuitry (RASP) for analysing data in a received stream and indexing the data as it is received, but there may be more than two such pipes. The recording and playback circuitry 16 is also configured to perform decryption of received data, for example before the video and audio data is transmitted for playback on a display, using stored decryption keys according to the encryption technique used to encrypt the received data.

The received signals comprise digitally encoded data. In this example, the data is compressed using the Digital Video Broadcast/Moving Pictures Expert Group 2 or 4 (DVB/MPEG 2/4) standard which permits both programme data and additional data (for example interactive service data) to be transmitted in a single channel. DVB/MPEG 2/4 enables high compression ratios to be achieved. The hard disk 13 receives and stores compressed data. The data is decompressed only after retrieval from the hard disk 13.

Satellite (and indeed cable) programmes are usually scrambled to prevent unauthorised access by non-authorised subscribers. The receiver 3 therefore has an Integrated Conditional Access Module (ICAM) 14 which co-operates with a smart card 14a to determine whether the viewer has subscribed to a particular channel and is therefore authorised to access the channel. Parental control over channel access is also provided, at least in part, by the access control circuit 14. The receiver 3 further comprises a demultiplexing and descrambling circuit 15 which receives from a selector 17 data from the crossbar switch 11 for direct output or data from the hard disk 13 for playback. The demultiplexing and descrambling circuit 15 separates the data into video data and audio data for distribution to various locations within the receiver 3. The demultiplexing and descrambling circuit 15 is also controlled by the access control circuit 14 to enable the descrambling of the signal by authorised subscribers. The receiver 3 also comprises a video decoder 18 for decompression and processing of encoded video data received from the demultiplexing and descrambling circuit 15, and an audio decoder 19 for decompression and processing of compressed audio data, operating according to the MPEG 2/4 or H.264/H.265 standards, for example.

Decompressed video data is supplied to standard definition display circuitry 20 and high definition display circuitry 21 which combines the decompressed video data with corresponding standard definition or high definition on-screen display and graphics generated by on-screen display and graphics generation circuitry 22 using the user services and programme scheduling data. The standard definition display circuitry 20 provides the combined standard definition video and graphics data to a standard definition digital encoder and Digital to Analogue Converters (DACs) 24 where the data is encoded and converted into an appropriate format for direct input to a television set. The high definition display circuitry 21 supplies the combined high definition video and graphics data to a high definition digital encoder and Digital to Analogue Converter (DAC) 25 where the data is encoded into an appropriate high definition format for output to a high definition TV if so desired. The combined high definition video and graphics data is also supplied to a High Definition Multimedia Interface (HDMI) interface 26 which also receives decompressed audio data from the audio decoder 19 via audio post-processing circuitry 27, for output to an HDMI input of a high definition TV if so desired. Decompressed and processed audio data is also supplied to an audio DAC 31 for direct input to an analogue audio device or speakers. The demultiplexing and descrambling circuit 15 also outputs compressed digital audio to a proprietary audio interface, for example in accordance with the Sony/Philips Digital Interconnect Format (SPDIF) 33 for direct input to appropriate audio equipment.

The receiver 3 is controlled by a processor 23 which communicates with the various units of the receiver via a bus (not shown). The processor 23 has associated with it Random Access Memory (RAM) 34. The processor 23 controls operation of the receiver 3 by tuning the tuners 10a and 10b to receive signals for the desired channels by controlling the demultiplexing, descrambling and decompression so that the desired programme and/or interactive service data is displayed on the screen of the TV, and by controlling the hard disk 13 to record desired television programmes or to play back previously recorded television programmes. Viewer selection of desired programmes and customer services is controlled by viewer manipulation of a RCU 28, which in response to such viewer manipulation transmits control signals to an RCU interface 29 for input to the processor 23. The RCU interface 29 may include a Bluetooth® interface and/or an infrared (IR) interface for communication with an RCU 28, as described below.

The RCU 28 also allows the viewer to control of the operation of the hard disk 13 to record television programmes, to play back recorded television programmes and to program the recording of television programmes, etc.

Operation of the receiver 3 is controlled by software and/or firmware that makes the processor 23 responsive to control signals from the RCU 28 and/or additional data in the received signals. Interaction between hardware and software in the receiver 3 may be as described in detail in the Applicant's earlier international patent application published as WO 01/11865. Operation of the receiver 3 in receiving and decoding data representing television programmes and data defining scheduling and other information related to the programmes may be substantially as described in detail in the Applicant's earlier international patent application published as WO 96/37996. Operation of the receiver 3 in providing interactive services may be substantially as described in the Applicant's earlier international patent application published as WO 97/23997.

Within the Digital Video Broadcasting (DVB) standard for digital television broadcast there exists a standard for the transmission of schedule information such that it can be decoded and presented correctly to subscribers in the form of an Electronic Programme Guide (EPG). This DVB standard is known generally as the SI standard and can be found in the specification: ETS 300 468, ETSI Digital Broadcasting Systems for Television, Sound and Data Services; Specification for Service Information (SI) in Digital Video Broadcasting (DVB) Systems 2nd edition. Guidelines for using the specification are given in ETSI ETR 211—DVB SI Guidelines. The receiver 3 is designed to support the SI specification.

In addition to operating data for use in controlling access to channels, additional data in a channel can include brief programme schedule data representative of so-called event information tables (EITs) defining the scheduling of programmes in each channel. The programme schedule data is stored in the RAM 34 and, once stored, the scheduling information is available effectively instantaneously. Alternatively, the programme schedule data may be stored in the hard disk 13. The programme schedule data is transmitted regularly so that the receiver 3 will be updated substantially continuously. As those skilled in the art will appreciate, the transmitted information may be brief to enable each channel to carry a reduced set of programme schedule data without excessive overheads in terms of bandwidth requirements in each channel and memory requirements in the receiver.

In addition, a dedicated EPG channel transmits more detailed programme scheduling information, such as programme synopsis or other ancillary data associated with the scheduled programmes, which is stored in the hard disk 13. The information transmitted via this dedicated channel is updated more frequently and covers a longer period of time (e.g. two weeks). As a consequence, an up-to-date television programme schedule of a complete week should always be available. As explained in greater detail below, the receiver 3 is arranged to display the programme scheduling information for several of the channels over a predetermined period of time on the TV. Also, a viewer can interact with the receiver 3 to program recordings of television programmes, view a desired part of the available programme schedule, etc., on the basis of the information received via the dedicated EPG channel.

Since the tuners 10a and 10b can be tuned to receive different channels, it is possible for a first television programme in one channel to be displayed on a TV and recorded on the hard disk 13, while at the same time a second television programme in another channel is also recorded on the hard disk 13. Operation of the receiver 3 in providing simultaneous recording and playback may be substantially as described in the Applicant's earlier international patent application published as WO 01/11865.

The hard disk 13 of the receiver 3 is similar to conventional hard disks used in computer systems for storing large amounts of data. The hard disk 13 has a capacity of many gigabytes to a few terabytes (e.g. 500 gigabytes or 1 terabyte) and receives video and audio data via a SATA interface, for example, for storage in the compressed form in which it is received, for example, in accordance with the DVB/MPEG 2/4/H.264/5 standards as discussed above. This allows for the storage of several hours of television programmes (e.g. 100+ hours) on the hard disk 13. The hard disk 13 comprises two storage areas, one for the storage of television programme data, and the other for storing metadata which is used to control the hard disk 13, for example as discussed in greater detail in the Applicant's earlier patent publications mentioned above. The processor 23 controls the operation of the hard disk 13. More specifically, the processor 23 controls the recording and playback of television programmes to and from the hard disk 13. Other processors (not shown) can be used to control the hard disk 13 as appropriate, but the control is described in this document with reference to only processor 23 to facilitate understanding.

The receiver 3 also includes one or more external interfaces 35, such as a Universal Serial Bus 2 (USB2) port. The USB2 interface may be connected to a transcoding device (not shown) via a USB connector, which allows media content in a first format to be supplied from the receiver 3 and transcoded by the connected transcoding device into a second media coding format suitable for playback on a Personal Media Player (not shown). Operation of the receiver 3 in providing transcoding services may be substantially as described in the Applicant's earlier international patent application published as WO 06/125999.

Remote Control Unit (RCU)

Figure 2:
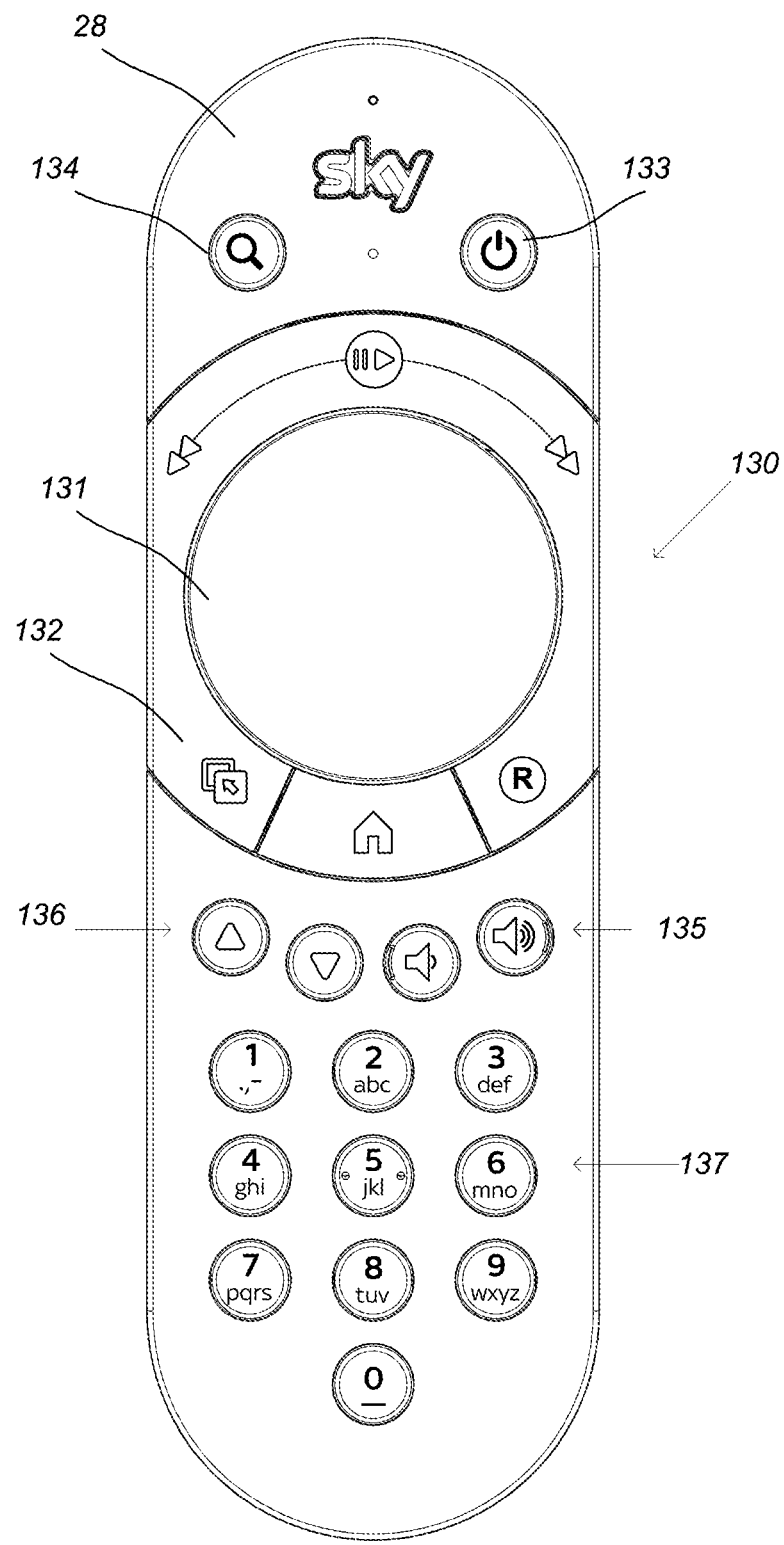
FIG. 2 is a schematic illustration of a remote control unit (RCU) for use with embodiments of the present invention.

As will be described in the embodiments below, a user navigates between particular display areas, programmes and menu items of an interactive user interface using one or more analog direction controls and/or appropriate button or key presses of a RCU 28. FIG. 2 shows an example of the front face of a RCU 28 for use with embodiments of the present invention. As shown in FIG. 2, the RCU 28 includes a capacitive touch pad 130 having a circular inner area 131 and an annular outer area 132. Markings may be provided on the inner area 131 and/or outer area 132, to indicate 'virtual' buttons or areas corresponding to specific functions, as will be described in more detail below.

The inner area 131 and outer area 132 may comprise physically discrete touch-sensitive areas, for example having separate outputs, or may comprise virtual areas of a single physical touch-sensitive area. In this embodiment, the inner area 131 comprises a discrete touch pad having one or more tactile or 'tact' switches coupled thereto, so that pressing the inner area 131 closes the tactile switch(es), preferably with tactile feedback to the user. In other words, the user may 'click' the touch pad of the inner area 131. Different tact switches may be closed by pressing different areas of the inner area 131, or a single tact switch may be closed by pressing any portion of the inner area 131. The latter may be preferable in that it does not require tilting of the touch pad of the inner area 131, which is mechanically complex and may lead to sticking.

The outer area 132 may include discrete sections coupled to tactile switches, which correspond to specific buttons, such as back-up button 123, home button 124 and record button 125. One or more other sections may be touch sensitive but not coupled to any tactile switches, such as the upper section of the outer area 132 as shown in FIG. 2. In this case, virtual buttons in the upper section are marked, for ease of identification by the user. The operation of such virtual buttons is determined by an RCU interface in the receiver 3, as described below.

The remote control 28 may also have physical buttons (i.e. keys or buttons defined in the hardware of the remote), separate from the capacitive touch pad 130. Examples in this embodiment include a power on/off button 133, search button 134, volume up/down buttons 135, channel up/down buttons 136 and numeric keys 137. Other configurations of physical buttons may be provided. Optionally, the capacitive touch pad may be replaced by discrete physical buttons, for example for cost reasons. However, the capacitive touch pad, or other analog direction control, may be required for some of the embodiments described below.

RCU to UI Interface

Figure 3:
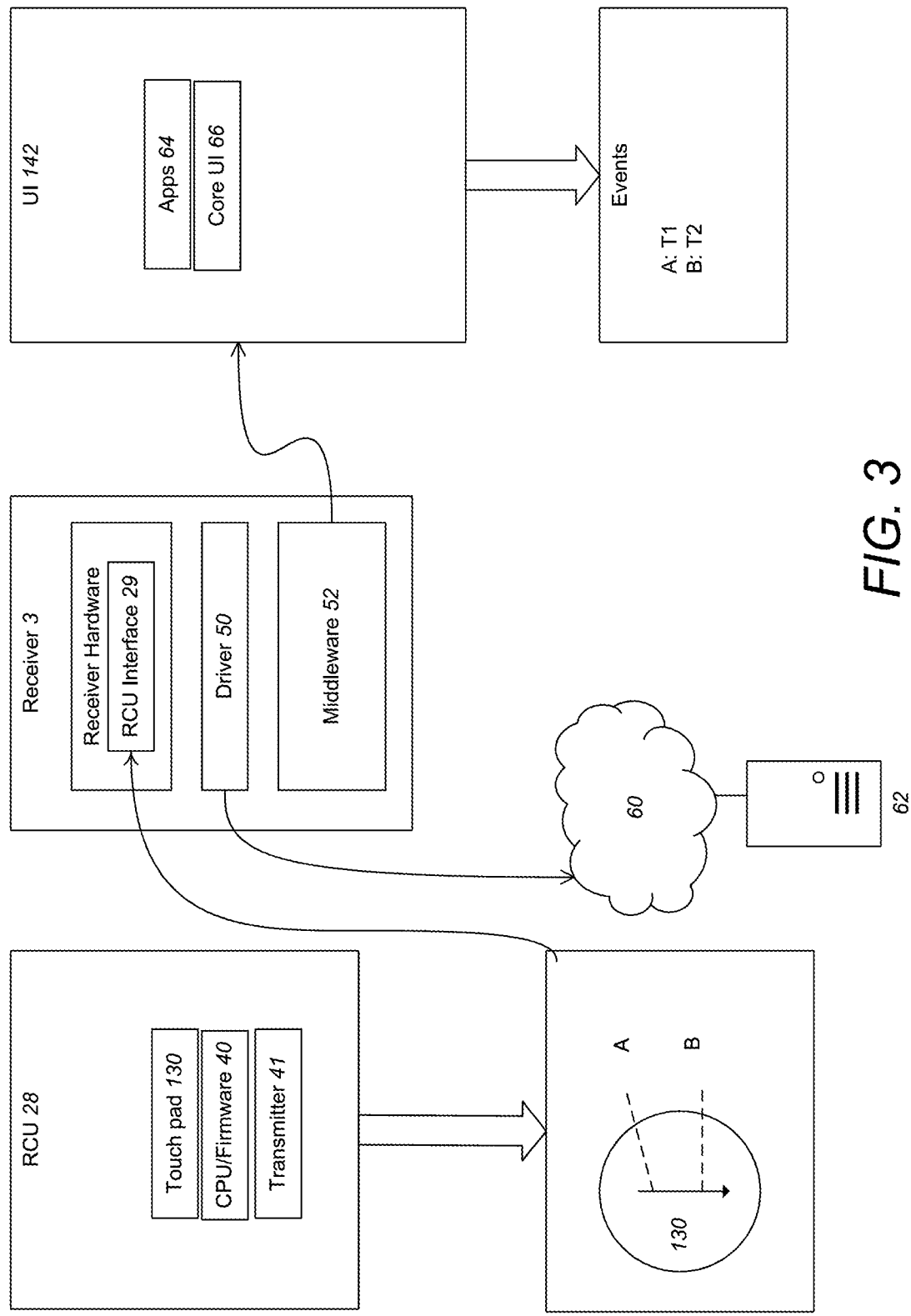
FIG. 3 is a schematic diagram of the RCU to UI interface in an embodiment of the invention.

FIG. 3 illustrates schematically the interface between the RCU 28 and the UI 142. The RCU 28 includes a CPU and firmware 40 and a transmitter 41 for communication with the RCU interface 29 using infra-red (IR) signals and/or short-range wireless link signals such as Bluetooth® signals, which allow higher bandwidth bi-directional communication. The RCU 28 may include a microphone (not shown) for receiving voice commands from the user; these are encoded as audio signals and sent over the wireless link to the receiver 3. Voice recognition is performed on the audio signals to interpret the commands; the voice recognition may be performed at the receiver 3 or by a remote server 62 connected to the receiver 3 over a network 60, such as the Internet.

The RCU 28 detects the absolute X and Y coordinates of the touch position on the areas 131 and 132 as discrete touch events and sends these to the RCU interface 29 as periodic samples (e.g. at 100 Hz).

The RCU 28 also outputs, to the RCU interface 29, signals indicating pressing of the tactile switches and physical buttons.

The signals received by the RCU interface 29 are converted by an RCU driver 50 at the receiver 3 into user interface commands for output to user interface (UI) components 142, via middleware 52. The UI components 142 include a core UI layer 66, for example Qt™ and an app layer 64, for example Luna.

The touch events A, B are time-stamped with the times T1, T2 at which they were received by the UI components 142. The RCU 28 in this embodiment does not include a clock, and the wireless link signals (e.g. Bluetooth® signals) from the RCU 28 to the RCU interface 29 are not time-stamped. As there is variable latency between the RCU 28 and the middleware 52, the times T1, T2 may not accurately correspond to the relative timings of the touch events. To overcome this problem, the times T1, T2 are quantized to intervals of 10 ms (i.e. to the nearest 0.01 s). Since the RCU 28 samples the touch events at 10 ms intervals, and the latency variation is assumed to be less than 5 ms, the quantization to 10 ms intervals should correct for latency variation.

The method of conversion of signals by the driver 50 depends on the type of input from the RCU 28. For example, a press of a physical button on the RCU 28 is converted into a corresponding user interface command. However, the outputs from the touch pad 130 require more complex conversions, as described below.

Figure 4:
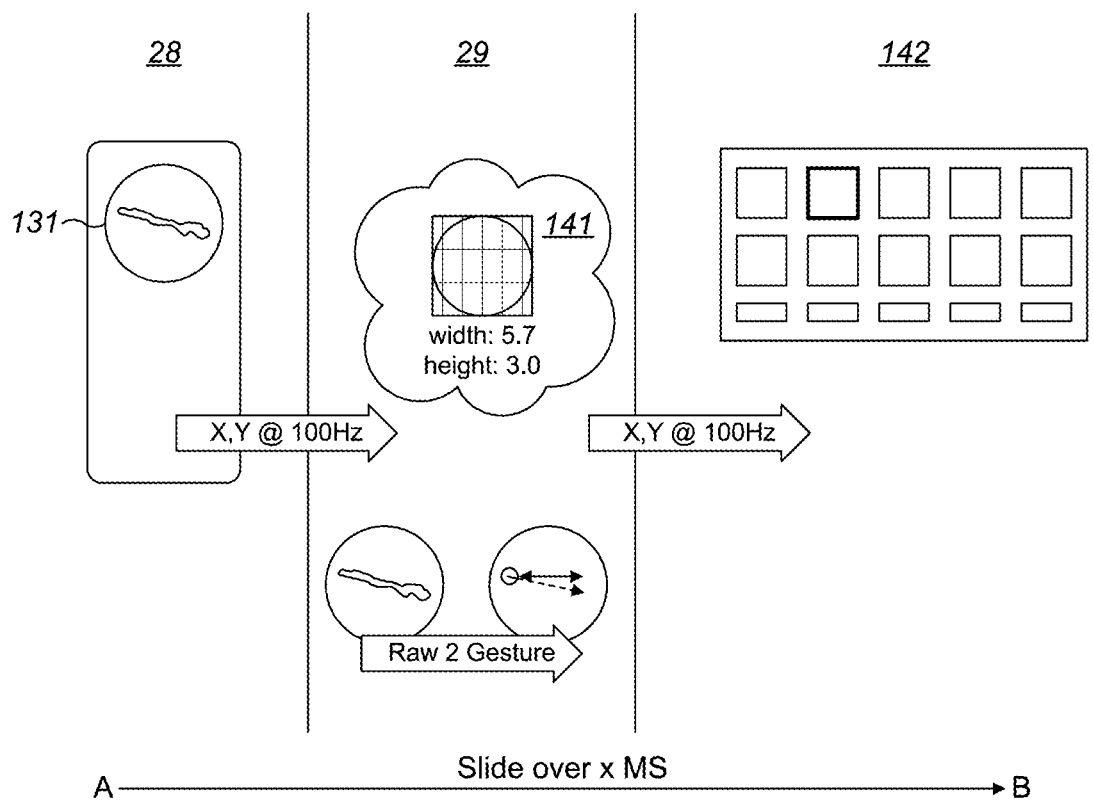
FIGS. 4 and 5 are schematic diagrams illustrating the operation of an RCU interface in an embodiment of the invention.
Figure 5:
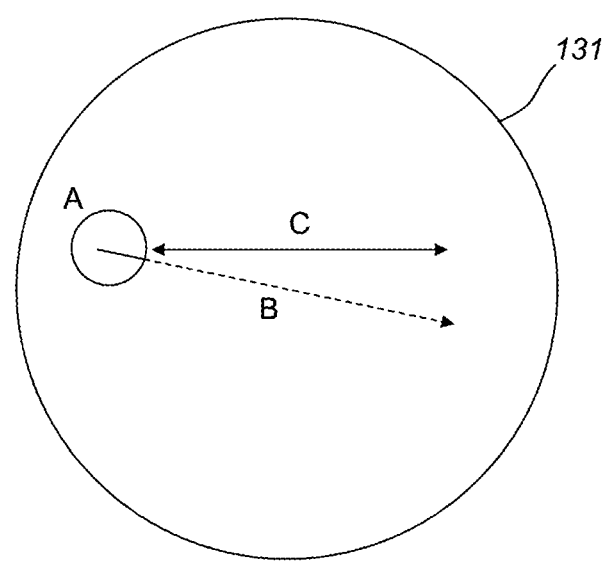

As illustrated for example in FIGS. 4 and 5, a tap or click by the user on a single position of the inner area 131 is converted to an absolute position in a grid 141 having a low resolution, such as 5 horizontal cells by 3 vertical cells. This absolute position may be used to select an item in a corresponding grid in a user interface component 142. For example, as shown in FIG. 4, a tap in a position corresponding to the coordinate {2, 3} on the grid 141 may cause the user interface component 142 to highlight a cell with a corresponding coordinate on a displayed grid. Where the tap is performed with enough force to close a tactile switch of the inner area 131, this is recorded as a 'click' by the RCU interface 29 and may result in a different command being output to the user interface 142, which may then perform a different action depending whether a tap or a click is performed at an absolute position. Alternatively, a click may be required and a tap alone may result in no action.

In another example, the user may input a relative movement command, for example using a touch movement or gesture performed on the inner or outer area 131, 132 of the touch pad 130. The RCU interface 29 receives as input the periodic X and Y coordinates of the touch position and detects whether a series of these periodic coordinates corresponds to a predefined gesture, for example by reference to a stored gesture library. If a predefined gesture is detected, the RCU interface 29 outputs the gesture with detected parameter values, if relevant. The output gestures are provided as periodic input to the UI component(s) 142. Preferably, this output is continuous so that the user interface can respond to the gesture as it is performed. This allows the user interface to respond smoothly, preferably with an animation effect to provide visual feedback to the user.

A plurality of different possible gestures may be predefined in the gesture library, and in the present embodiment there are at least two such gestures, referred to as 'slide' and 'swipe'. A 'slide' gesture comprises a long, approximately linear touch movement; the corresponding output indicates the velocity and optionally the acceleration of the movement, as well as its horizontal or vertical direction; the corresponding output is preferably output substantially continuously or periodically, and varies according to the current properties of the 'slide' gesture until the gesture is determined to have finished, for example in response to the user moving out of contact with the touch pad 130. A 'swipe' gesture comprises a short, quick linear touch movement; the corresponding output is simply the horizontal or vertical direction of the swipe.

Preferably, the RCU interface 29 filters out small, involuntary gestures by the user, caused for example by the user resting a digit on the touch pad 130. As illustrated in FIG. 5, the RCU interface 29 does not respond to any movement within a zone A defined with respect to the initial touch point on the inner area 131, for example within a predetermined radius from the initial touch point. However, when the touch point moves outside the zone A, the RCU interface 29 determines the direction of travel of the touch point from the initial point of contact, and begins to output this direction.

The UI components 142 are used to display the EPG in a grid format, and various horizontal or vertical menus, and therefore need only respond to vertical or horizontal movement commands; diagonal or rotational commands are not supported. The RCU interface 29 therefore interprets a directional gesture by the user as being entirely horizontal or vertical and provides a corresponding output to the UI components 142. For example, the user may move the touch point along the vector B, which is at an angle to the horizontal direction but closer to being horizontal than vertical. The RCU interface 29 therefore resolves the vector B along a horizontal vector C. The direction of the gesture is 'locked' in a horizontal direction, and any subsequent movement of the touch point will be resolved in that direction until the user's finger is lifted from the touch pad 130. Hence, the RCU interface 29 will output subsequent changes of direction along the horizontal, but will not respond to any vertical component of the gesture. Likewise, if the gesture is determined to be vertical, only the vertical component will be output.

Figure 6:
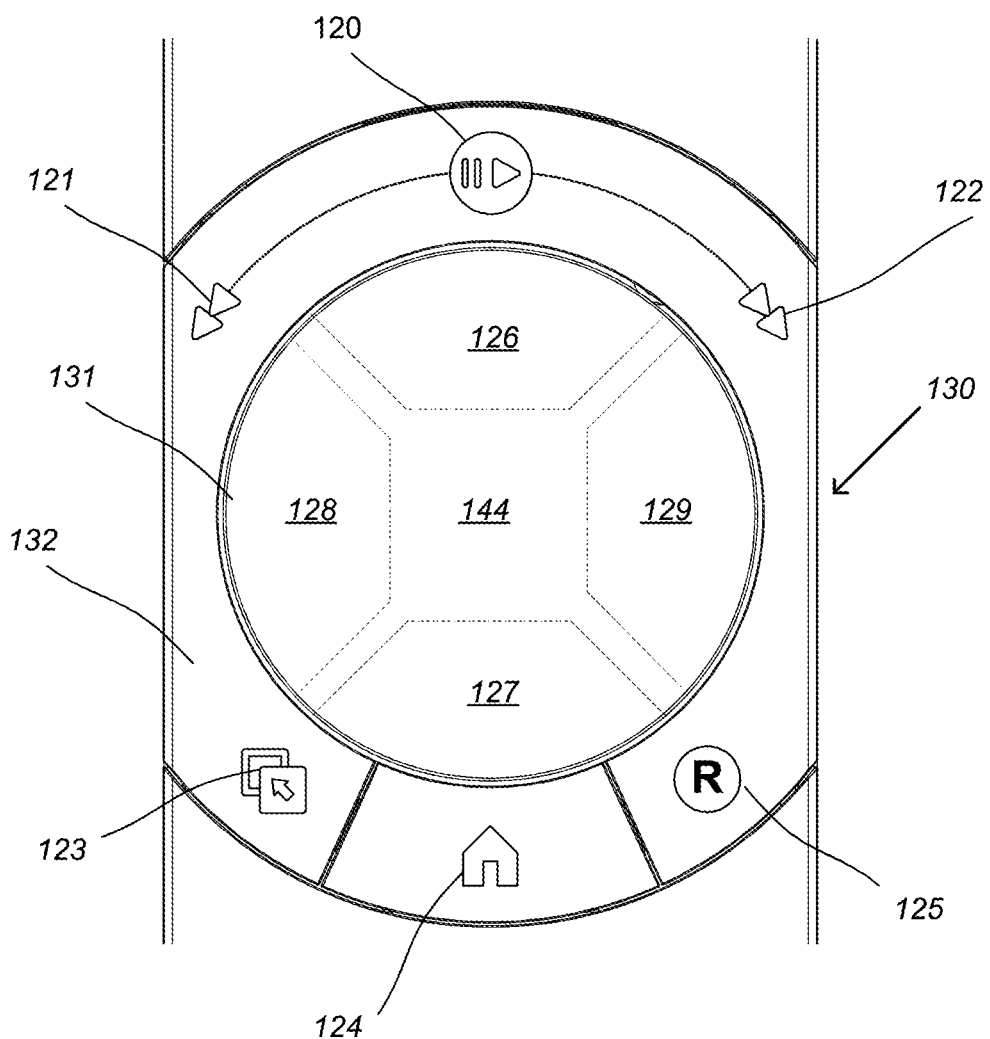
FIG. 6 shows virtual button areas on a touch pad of the RCU.

The RCU interface 29 may also respond to discrete taps or clicks on predetermined areas of the touch pad 130 corresponding to virtual buttons, as shown for example in FIG. 6. For example, on the inner area 131, virtual 'up', 'down', 'left' and 'right' buttons 126, 127, 128, 129 may be defined, optionally with a central 'select' button 144, such that a tap or click in the corresponding area causes the RCU interface 29 to output an up, down, left, right or select command. These commands may be advantageous for backwards compatibility with remote or game controls that have corresponding physical buttons. The virtual buttons need not be visually marked on the inner area 131, and their shape and size may be reconfigured according to user interface requirements.

Where the inner area 131 has only one corresponding tactile switch, the position of a 'click' may be determined from the detected touch position on the inner area 131. Therefore, multiple virtual clickable buttons may be defined, using only a single tactile switch.

Virtual buttons may also be defined on the outer area 132. In this example, the upper section of the outer area 132 contains virtual play/pause button 120, rewind button 121 and fast forward button 122, such that a discrete tap on these buttons causes the RCU interface 29 to output a corresponding play/pause, rewind and fast forward command. Multiple taps of the rewind button 121 or fast forward button 122 may increase the speed of rewinding or fast forwarding respectively, for example from 2× to 6×, 12× and 30× speed with each tap.

A 'slide' gesture, starting from any point on the outer area 132, may generate a rewind or fast forward speed command depending on whether the direction of the gesture is to the left or to the right. Once the direction is determined, the remaining space between the starting point of the gesture and the end of the outer area is divided dynamically into four speed regions. As the gesture moves through these regions, the trick play speed (×2, ×6, ×12, ×30) increases correspondingly. If the gesture is 'held', by maintaining contact with the outer area 132, then trick play continues at the speed corresponding to the region in which the gesture is held. Once the gesture is released, by breaking contact with the outer area 132, then playback resumes at normal speed.

In playback mode, the user may perform a horizontal swipe gesture on the inner area 131 in order to skip back or forward a predetermined length of time in the programme, such as 5 minutes, relative to the current playback point. The length of time of the skip may vary according to the overall length of the programme being played back, increasing for longer programmes.

In playback mode, the user may perform a horizontal 'slide' gesture on the inner area 131 to move forward or backward to a specific time point in the programme, according to the direction of the slide. Playback pauses when the user touches the inner area 131 at the beginning of the slide, and the selected time point may be indicated on-screen as the slide gesture is performed. Playback may resume when the user clicks the inner area 131, or alternatively when the user releases the gesture by breaking contact with the inner area 132.

The RCU interface 29 and UI component 142 may also respond to a combination of a gesture and one or more clicks. For example, a 'slide' followed by one or more clicks may be used to scroll through items in the user interface and then step through individual items, giving a combination of gross and fine control. This may be useful for example when controlling an on-screen keyboard, where the slide gesture is used for relative movement to an area of the keyboard, while the clicks are used to select between different keys within that area.

The RCU interface 29 and UI component 142 may also respond to a combination of a swipe gesture and a 'hold', where the user's digit remains in contact with the touch pad 130 at the end of a gesture. The UI component 142 may be responsive both to the direction of the gesture and the length of time of the 'hold'. This combination provides a simple method of controlling the speed of movement (e.g. scrolling) through the UI component, dependent on the length of time of the 'hold'. Users may find it easier to control speed using the time (e.g. of the hold) rather than speed (e.g. of the swipe).

The 'hold' may be considered to end when the user's digit is removed from the touch pad 130, or when the user begins to move the digit once again. This allows a transition from the 'hold' to a new swipe or slide gesture, for example to reverse the direction of the previous gesture.

User Interface with Visual Feedback

The UI components 142 provide continuous visual feedback of user interaction with the RCU 28, and particularly with the touch pad 130. With a conventional RCU, a single button press causes a discrete change to the user interface, such as a different item being selected or highlighted, so the user does not need additional visual feedback. With an analog direction control such as the touch pad 130, a gesture may not immediately result in a discrete change to the user interface, so it is advantageous to provide continuous visual feedback in response to a gesture. On the other hand, it would be distracting to show on the display a pointer that follows every movement of the analog direction control, as is the case with a conventional mouse pointer.

In an embodiment of the invention, an indicator is shown on the display indicating horizontal or vertical motion detected on the touch pad 130, with the filtering and directional locking described above. The indicator may comprise a background lighting effect, glint or 'spotlight' centred on the location of the indicator on the display. The indicator is displayed separately from highlighting of EPG or menu items on the display, but the highlighting may change in response to the indicator moving on to or into proximity with a displayed item, as described below with reference to FIGS. 6a to 6c, which show an example of items I1, I2 and I3 in a grid as part of an EPG display.

Figure 7A:
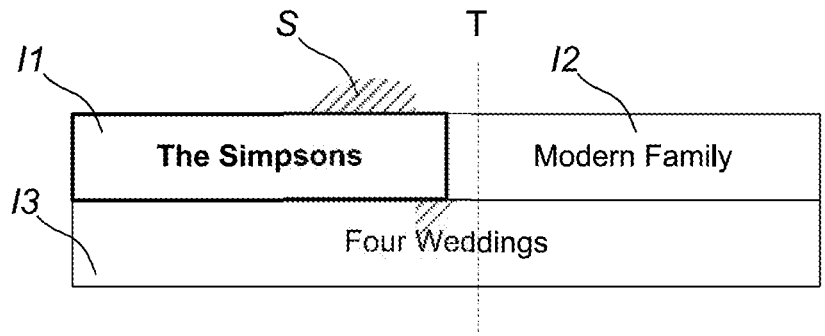
FIGS. 7a to 7c are schematic diagrams illustrating continuous visual feedback on a display in response to a gesture performed on the touch pad.
Figure 7B:
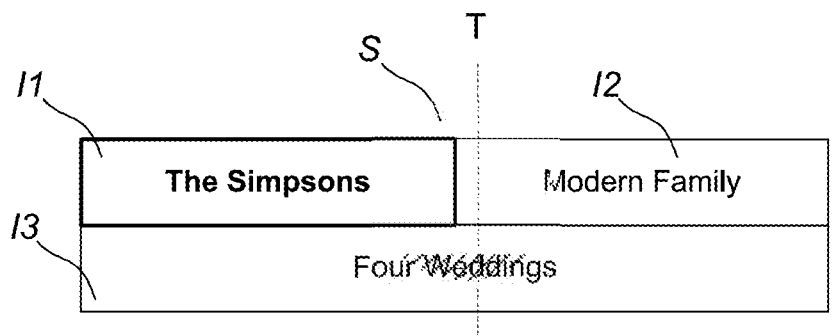
Figure 7C:
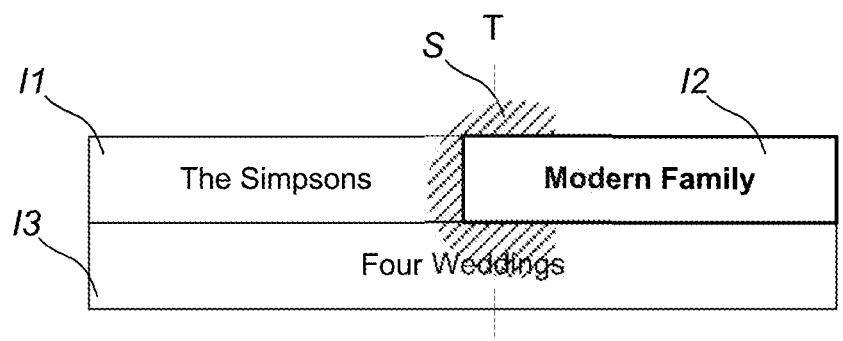

The indicator centre position is shown as a dashed cross in the figures, but in an actual display only the spotlight, centred on the indicator position, is shown. As shown in FIG. 7a, the item I1 is currently highlighted and the indicator S is centred under the item I1. The user performs a horizontal slide gesture to the right, so that the centre of the indicator S moves under the next item I2 to the right. A horizontal threshold T is defined, a predetermined distance past the border between the items I1 and I2 in the direction of travel of the indicator S. In FIG. 7b, the indicator position has traveled past the border, but not past the threshold T, and item I1 is still highlighted. In FIG. 7c, the indicator position has traveled past the threshold T and the next item I2 is now highlighted.

A similar procedure is followed when performing a slide gesture to the left, except that the threshold T is define a predetermined distance to the left of the border between the items I1 and I2, since the direction of travel is to the left from item I2 to I1.

A similar procedure may be followed when moving in a vertical direction, with the threshold T defined a predetermined distance past a horizontal border between items in the direction of travel. The threshold T provides hysteresis between the indicator position and the highlighting of items, so that the highlighting does not flip rapidly between items as the indicator position passes back and forth over the border between them.

Alternatively, the threshold T may be defined a predetermined distance before the border, or on the border, determining how quickly the next item should be highlighted, and whether hysteresis is required.

However, preferably the spotlight or other indicator S does not move in the vertical direction, but a scroll operation in the vertical direction causes the menu items to scroll vertically beneath the indicator. When the scroll operation is completed (for example by the user ending a slide gesture), the menu items may 'snap' into alignment with the indicator S so that only one menu item is highlighted, but this may cause a problem when the indicator is half way between two menu items and it is not clear to the user which menu item will be selected.

Figure 8A:
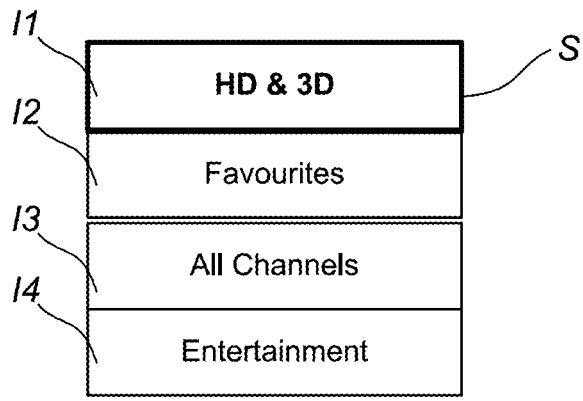
FIGS. 8a to 8c show a scroll operation for a vertical menu.
Figure 8B:
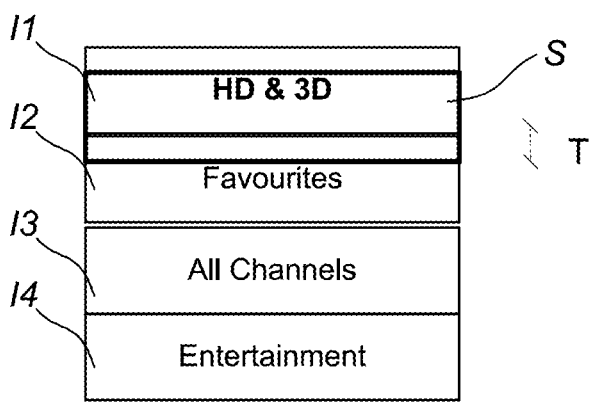
Figure 8C:
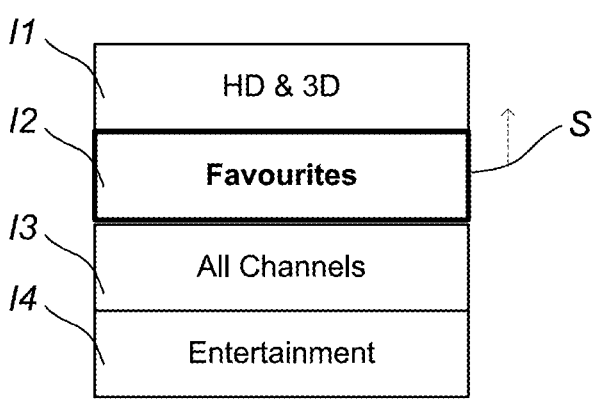

A solution to the above problem is illustrated in FIGS. 7a to 7c. In this case, a vertical menu comprises a set of vertically arranged rectangular items I1-I4 and the indicator S comprises a rectangle that is fixed in the vertical direction. At the start of a vertical scroll operation, as shown in FIG. 8a, the first item I1 ('HD & 3D') is positioned under and aligned with the indicator S. In response to a vertical gesture input by the user, such as a 'slide' gesture, the vertical menu begins to move vertically under the indicator S, as shown in FIG. 8b. This provides visual feedback of the gesture to the user. When the vertical menu has moved by a threshold amount T less than half the vertical height of the items I1-I4, for example by 20-30% or 25% of the vertical height, the vertical menu 'snaps' or slides quickly into the position shown in FIG. 8c, as indicated by the dashed arrow, with the indicator S aligned with the next item I2 in the direction of movement. If the gesture continues, the menu continues to move as shown in FIGS. 7b and 7c for each item I1-I4 in turn.

In a variant where the items I1-I4 have varying vertical heights, the threshold amount for initiating the 'snap' action may be a constant, preferably less than half the smallest height among the items I1-I4. Hence, the same length of gesture is required to move each item under the indicator S. Alternatively, the threshold amount may be proportional to the height of the next item I1-I4 in the direction of motion and/or the height of the currently selected item I1-I4.

A similar 'snap' action may be applied to alternative arrangements, for example to horizontal menus and/or to scenarios where the indicator S moves and the items I1-I4 are stationary.

Figure 9:
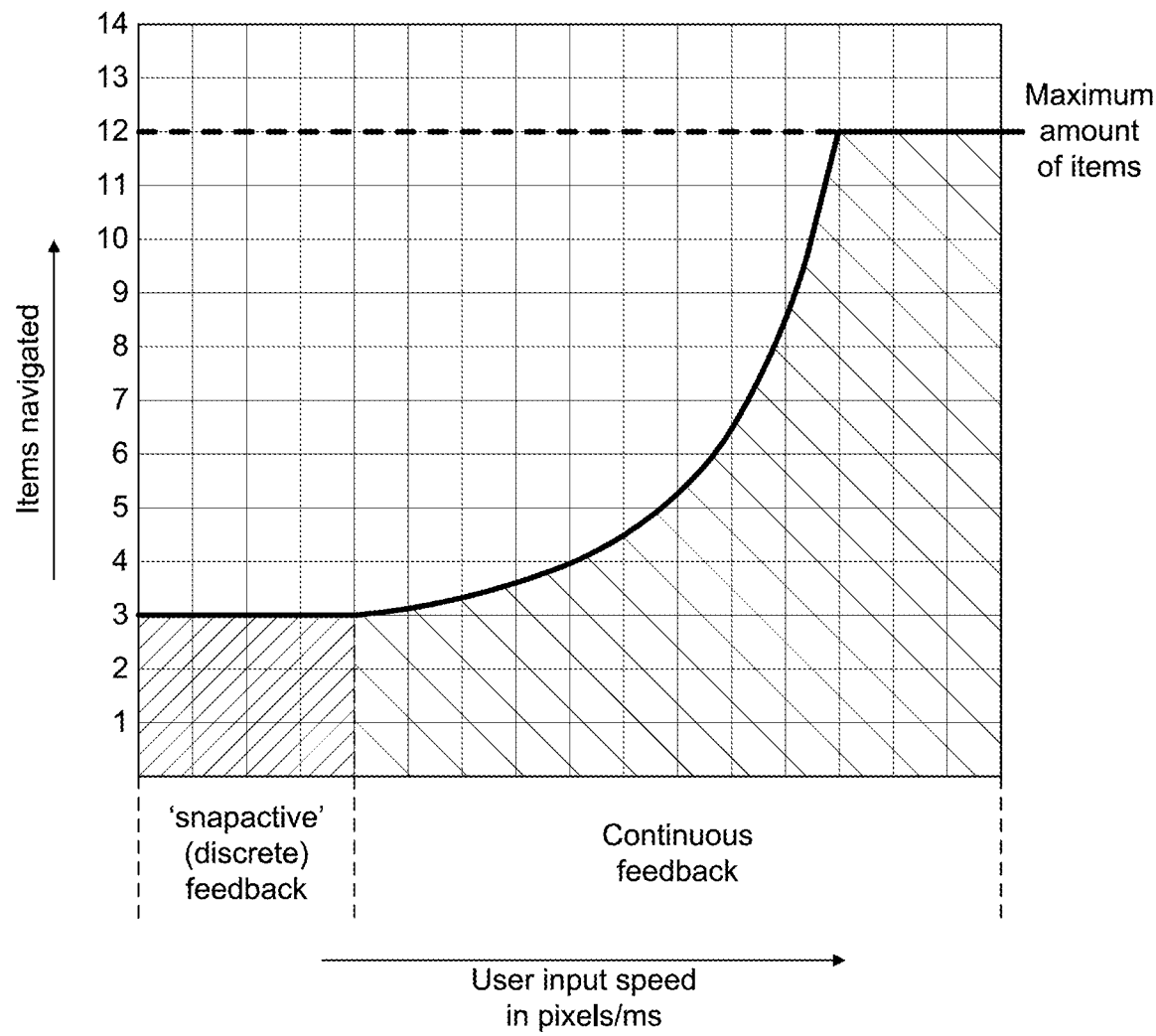
FIG. 9 is a graph illustrating a scrolling method.

The scrolling action may be dependent on the speed and/or acceleration of the scroll, determined for example by the speed of a slide gesture or the length of time of hold in a 'swipe and hold' gesture: for example, if the speed and/or acceleration is above a predetermined threshold, the vertical menu scrolls without the 'snap' action. This allows quick navigation through a list until the desired item approaches, at which point the user may slow the gesture and allow a positive selection of the desired item by means of the 'snap' action. Additionally or alternatively, the scroll 'gearing' (i.e. the distance or number of items moved in the user interface as a function of the distance moved in the gesture) may depend on the speed and/or acceleration of the gesture. For example, as shown in FIG. 9, the scroll gearing may be constant at low gesture speed range S1, but may increase at a higher gesture speed range S2 until a maximum gearing is reached at gesture speed range S3. The 'snap' action is only performed within the low gesture speed range S1. This allows quick navigation through a long menu, with precise selection of the menu item required.

In the case of a 'swipe and hold' gesture, the scrolling speed may move from a lower speed to a higher speed after a predetermined length of time of the hold. Preferably, the scrolling speed increases smoothly from the first speed to the second speed, following for example a Bezier curve.

Additionally or alternatively, the scroll speed may be increased by performing multiple slide or swipe gestures in quick succession, in the same resolved X or Y direction.

Some users may inadvertently rest a digit on the touch pad 130, which may cause involuntary interaction with the user interface if the digit is moved. To alert the user to such contact, the spotlight or other indicator S may be displayed only in response to user contact with the touch pad 130, or the indicator S may change in brightness or appearance in response to the user contact.

Interpolation

In the user interface 142, it is desirable to animate changes smoothly but responsively to user input. The user interface 142 should respond to the user input without excessive lag, but some degree of lag may be desirable so that the changes appear smooth. In conventional animation techniques known as 'tweening', start and end points are defined and the animation then follows a predefined transition between the start and end points. However, in the present embodiments the user input and hence the end point may be constantly changing, for example as the speed, position or acceleration of a 'slide' gesture changes.

In an embodiment of the invention, interpolation between start and end points is determined on the basis of the current position and the current destination or target position. For example, in the case of animated motion in the x direction, given the current position $x_s$ and the destination position $x_e$, the next position $x_1$ is calculated as follows:

$$x_1 = x_s + (x_e - x_s)/I \qquad (1)$$

where I is the level of interpolation.

This type of animation combines responsiveness and smoothness. In contrast to 'tween' animation, there is no need to calculate a long list of coordinates from the beginning to the end, and there is no need to specify the time that the animation takes. The destination position can constantly change without affecting smoothness, and providing a quick response to user interactions.

The level of interpolation I may be a constant. However, this would result in the animation slowing down when it reaches the destination position. Hence, a variable level of interpolation I may be calculated, for example according to the following equation:

$$I = \min(|\text{offset}|, T) * (I_{max} - I_{min})/T + I_{min} \qquad (2)$$

where:

offset is the distance between the current and destination position $(x_e - x_s)$ $I_{min}$ is a minimum level of interpolation, preferably but not necessarily constant;

$I_{max}$ is a maximum level of interpolation, preferably but not necessarily constant; and T is a threshold offset value that determines when the level of interpolation starts changing linearly from $I_{max}$ to $I_{min}$.

If the absolute value of the offset is greater than the threshold T, then the level of interpolation I is equal to $I_{max}$. When the offset is lower than the threshold T, I changes linearly from $I_{max}$ to $I_{min}$. This variable level of interpolation provides a better control and snaps faster to the destination point.

Figure 10A:
FIGS. 10a to 10c are schematic illustrations of an animated movement using an interpolation technique.
Figure 10B:
Figure 10C:
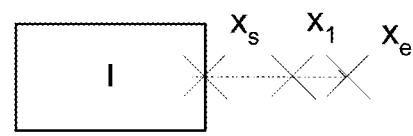

An example of this interpolation technique is shown in FIGS. 10a to 10c, for an item I having a current position $x_s$. The destination position $x_e$ changes in response to a user gesture input between FIGS. 8a and 8b, and stays the same between FIGS. 8b and 8c. In each case, the new position $x_1$ is calculated and becomes the current position $x_s$ for the next frame.

A new value of the next position $x_1$ may be calculated for each successive frame. Preferably, the frame rate is synchronised with the vertical refresh rate, for example at 50 or 60 Hz. However, the frame rate may drop in some circumstances, such as high processor load. For the interpolation to appear smooth, the new values are preferably calculated at a constant rate, independent of the frame rate and for example synchronised to the vertical refresh rate. If the frame rate drops below the vertical refresh rate, the new value will be used that is current when the frame is created.

The above embodiment has been described with reference to a change in position, but the interpolation technique may be applied to changes in other visual properties, such as brightness.

Full EPG Display

Figure 11A:
FIGS. 11a to 11d are screenshots of an EPG display.

FIG. 11a shows an example of a full-screen EPG display, comprising one of more vertical columns, and an EPG grid. A status column 170 includes a mini-TV window 172 showing a live feed of a currently tuned channel. A channel filter column 174 shows a menu of channel filters to be applied to the full EPG, which comprises a channel column 175 containing channel names, and an EPG grid 176 indicating programme titles in each channel, arranged along a horizontal axis representing broadcast time.

Figure 11B:

When a channel filter is selected from the channel filter column 174, an animation effect is displayed whereby the channel filter column 174 appears to slide away behind the status column 170, and the selected channel filter is displayed in the status column 170, as shown in FIG. 11b. This provides a visual cue to the user that the filter has been applied, and avoids the channel filter column 174 taking up space when it is not needed. The user may cause the channel filter column 174 to reappear by navigating to the status column 170 and selecting the channel filter indicated therein.

Figure 11C:
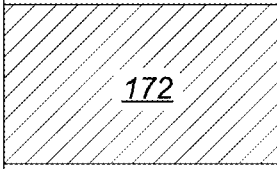

The user may navigate between the columns 170, 174, 175 and EPG grid 176, using gestures or clicks on the inner area 131 of the touch pad. The user may navigate to the EPG grid 176 and highlight a programme, whereupon a corresponding programme synopsis is displayed in a banner 178 at the top of the full EPG 176. As the user highlights other programmes, for example using a 'swipe' gesture or button press, the banner 178 is updated to show the corresponding synopsis. Alternatively, the user may scroll horizontally or vertically through the full EPG 176, for example using the 'slide' or 'swipe and hold' gesture. In this case, as shown in FIG. 11c, the banner 178 is automatically hidden during the scrolling operation. When the scrolling operation is complete, the banner 178 is automatically displayed once again, as shown for example in FIG. 11b, but showing the synopsis for the new highlighted programme. Advantageously, the banner 178 is automatically removed during scrolling when it would not be required, and would restrict the amount of space available for the full EPG 176.

During scrolling through the full EPG 176, the highlighting of individual programmes may be inhibited, so as to avoid a flickering effect caused by the highlight jumping to successive programmes. The highlighting may be inhibited immediately on scrolling, or the highlighting may remain on the programme highlighted when scrolling was initiated; this highlighted programme then scrolls off the screen. The display of the indicator or spotlight S may also be inhibited during scrolling of the full EPG 176. When scrolling is finished, highlighting may be restored, for example on the programme at the current position of the indicator S.

Figure 11D:

Scrolling of the EPG grid 176 is controlled so that the spotlight S remains at a constant vertical level, while horizontal movement of the spotlight S is constrained by left and right 'locking points' LL and LR, as illustrated in FIG. 11d. Hence, when the user scrolls vertically (i.e. by channel), the spotlight S stays at the same vertical position and the EPG grid 176 scrolls vertically under the spotlight S. When the user scrolls horizontally (i.e. by time), the spotlight S moves horizontally and the EPG grid 176 remains stationary until the centre of the spotlight S reaches the left or right locking point LL, LR, depending on the direction of scrolling. If the user scrolls beyond that point, the EPG grid 176 scrolls horizontally while the spotlight S remains stationary, until a boundary of the EPG grid is reached.

In an alternative embodiment, the EPG grid 176 scrolls horizontally while the spotlight S remains stationary, until a boundary of the EPG grid is reached, without the spotlight S traversing between the left and right locking points LL, LR. This may be considered as a specific example of the previous embodiment, where the left and right locking points are in the same position.

The left hand boundary of the EPG grid 176 is defined with respect to the current time, for example the current time rounded down to the nearest half hour. When the EPG grid 176 reaches the left hand boundary, and the user continues to scroll left, the spotlight S is allowed to move left past the left locking point LL, for example into one of the columns 170, 174, 175.

The user may be required to issue a separate command to move out of the EPG 175, 176 across a component border into another column, such as the status column 170.

The right hand boundary of the EPG grid 176 is defined by the limit of available EPG information, for example approximately 7.5 days after the current time. When the EPG grid is scrolled to the right hand boundary, the spotlight S is allowed to move right past the right locking point LR, for example to select a programme past the right locking point LR.

Scrolling of the EPG grid 176 is controlled by gestures and/or clicks, as described above. The speed of scrolling may be dependent on the speed and/or acceleration of the 'slide' gesture that causes the scrolling operation. The scrolling display is animated so that the scrolling speed appears to match the slide gesture speed.

The 'slide' gesture may continue across multiple items in a horizontal or vertical direction, with the indicator position continuing to move and the highlighting changing as described above, until the gesture is ended. Preferably, a 'slide gesture' should not be allowed to continue across a UI component boundary, for example from an EPG grid guide 176 to an adjacent menu, such as the channel filter column 174. In this case, the indicator position is stopped at or around the border of the last item in the grid guide, and is prevented from passing to an adjacent menu. The user must then perform another gesture, such as a 'swipe' gesture or a direction 'click', to move the highlight to the adjacent menu. To provide visual feedback of this limitation, an animation effect may be displayed in which the spotlight S is allowed to move a small distance into the display area of the adjacent menu, without highlighting any item in the adjacent menu, but returns back into the display area of the grid guide when the gesture is ended.

Image View

Figure 12A:
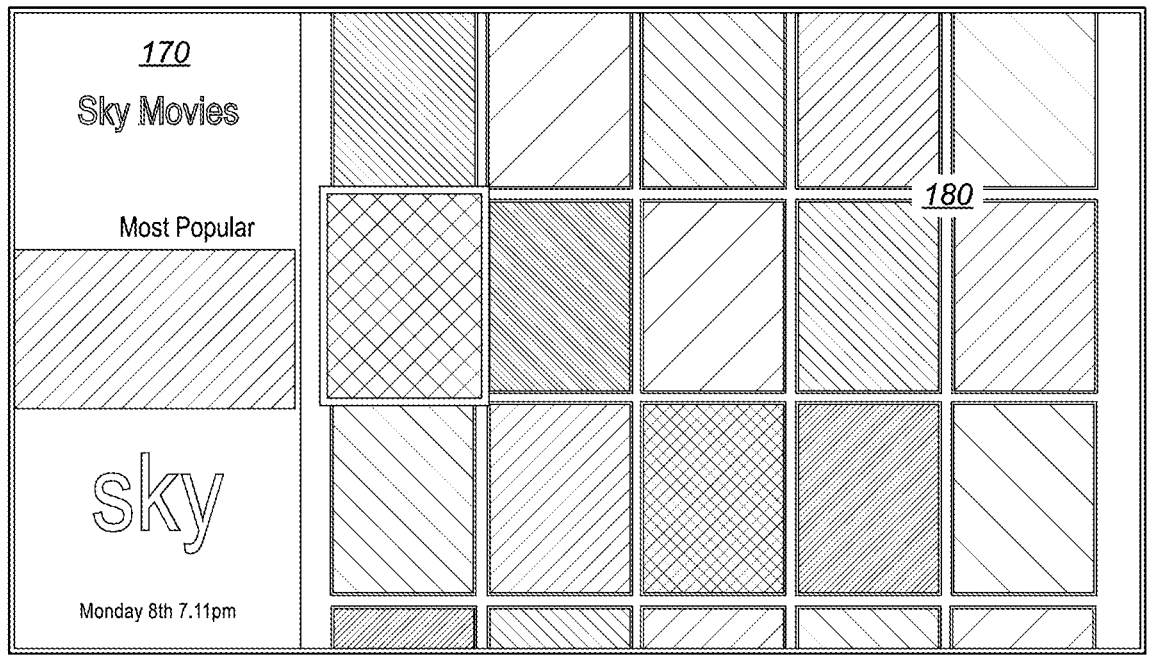
FIGS. 12a and 12b are screenshots of a programme image display.
Figure 12B:
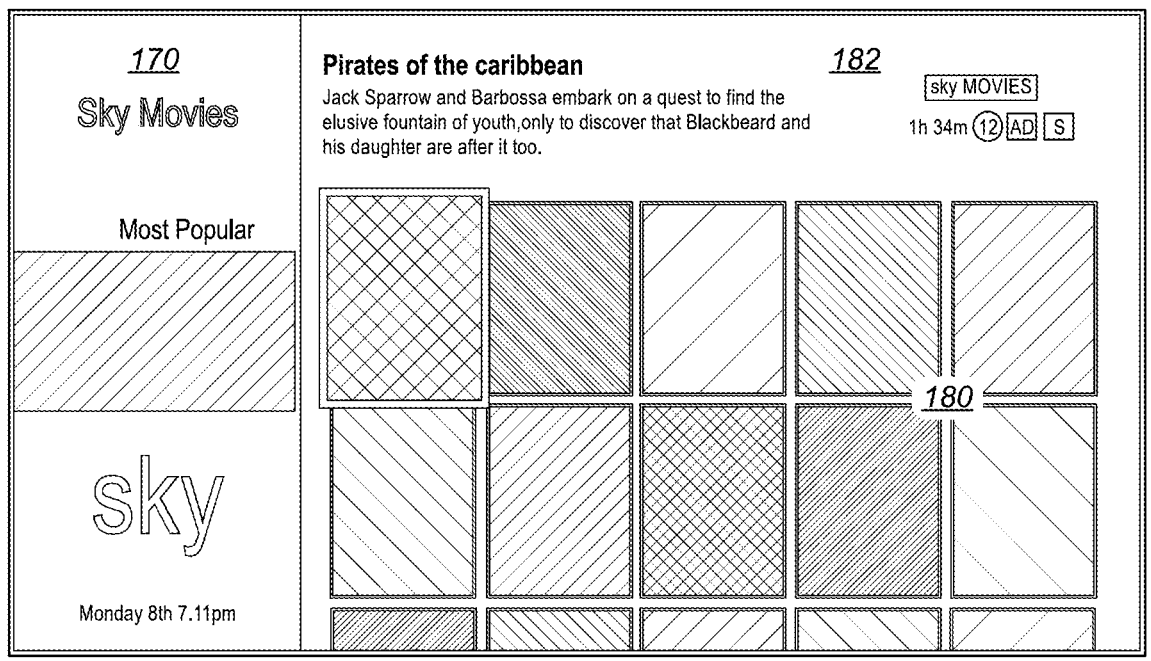

A programme image display is shown in FIGS. 12*a* and 12*b*, in which programmes are shown as still images 180 rather than programme titles. This EPG display is suitable for Video on Demand (VOD), Push VOD or pre-recorded programme selection, where broadcast times and channels are not relevant, and selection of a still image 180 causes the programme to be viewed substantially immediately. Alternatively, this view could be used to preview programmes to be broadcast, and selection of a still image causes the corresponding programme to be recorded when it is broadcast.

As shown in FIG. 12*a*, no programme synopsis is shown during scrolling through the images 180, using for example a 'slide' or 'swipe and hold' gesture. When the scrolling operation is concluded, a synopsis bar 182 is displayed above the images 180, showing a synopsis of the currently selected image, as shown in FIG. 12*b*. As with full EPG scrolling, highlighting of the images 180 may be inhibited during scrolling, or highlighting may remain on the image 180 highlighted when scrolling began, until the image scrolls off the screen.

Review Buffer Indicator

The receiver 3, when tuned to a channel for live viewing, begins to record that channel in a review buffer so that the currently viewed channel can be paused, rewound and fast forwarded back to the live viewing point. Technical details of the review buffer may be substantially as described in the applicant's patent publication WO-A-2003/043320.

As shown in FIGS. 13*a* to 13*d*, the status of the review buffer and viewing mode may be indicated by a progress bar 150 superimposed on the programme being viewed. The progress bar 150 may be displayed for a predetermined time after tuning to a channel, or in response to a command from the user, such as a pause, fast forward or rewind command. The start and end times of the programme being viewed are displayed respectively at the left and right hand sides of the progress bar 150, and the current time is displayed to the bottom left of the progress bar 150. The programme title of the programme being viewed is displayed above the progress bar 150. The extent of the review buffer is shown by a highlighted section of the progress bar 150.

A viewing point indicator 152 is displayed on the progress bar 150 at the current viewing point of the programme. The viewing point indicator 152 comprises an icon indicating the viewing mode, for example play, pause, fast forward and rewind. The time of the current viewing point from the start time of the programme is displayed below the viewing point indicator 152. In fast forward and rewind mode, the speed is indicated above the viewing point indicator 152.

In the example shown in FIGS. 13*a* to 13*d*, the receiver 3 has been tuned to the current channel from approximately 4:45 pm. The programme 'Stargate SG-1' was broadcast on that channel from 4 pm to 5 pm, and the programme 'Family—Bringing Up Baby' is being broadcast from 5 pm to 5:30 pm. The current time is 5:20 pm.

Figure 13A:
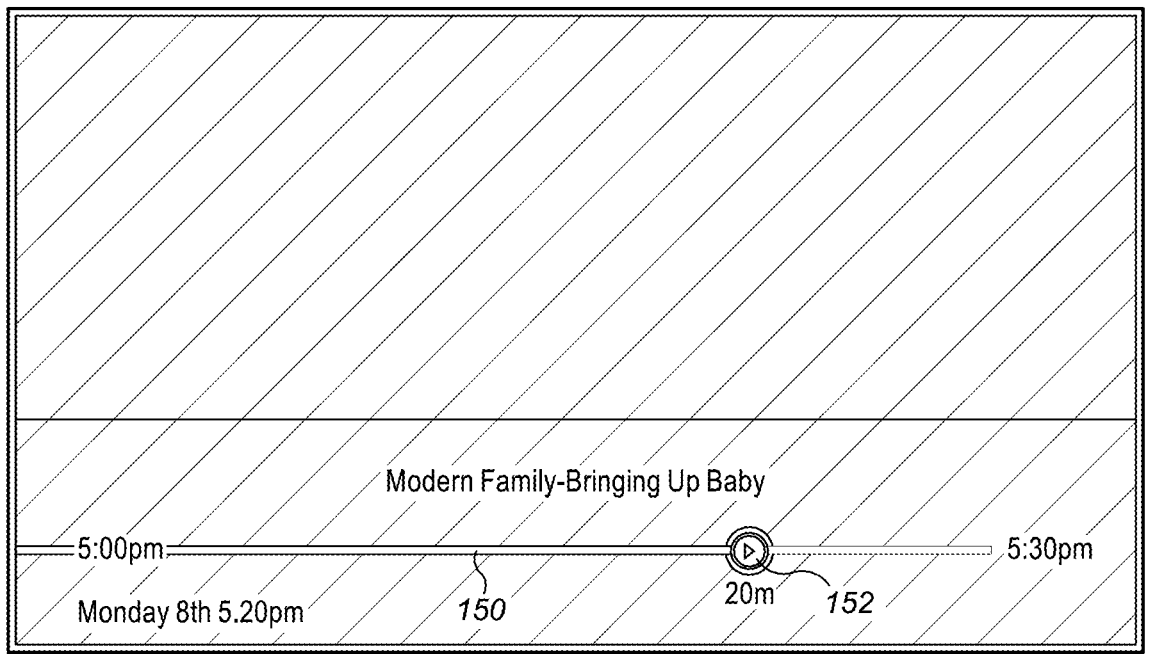
FIGS. 13a to 13d are screenshots showing a progress bar display.
Figure 13B:
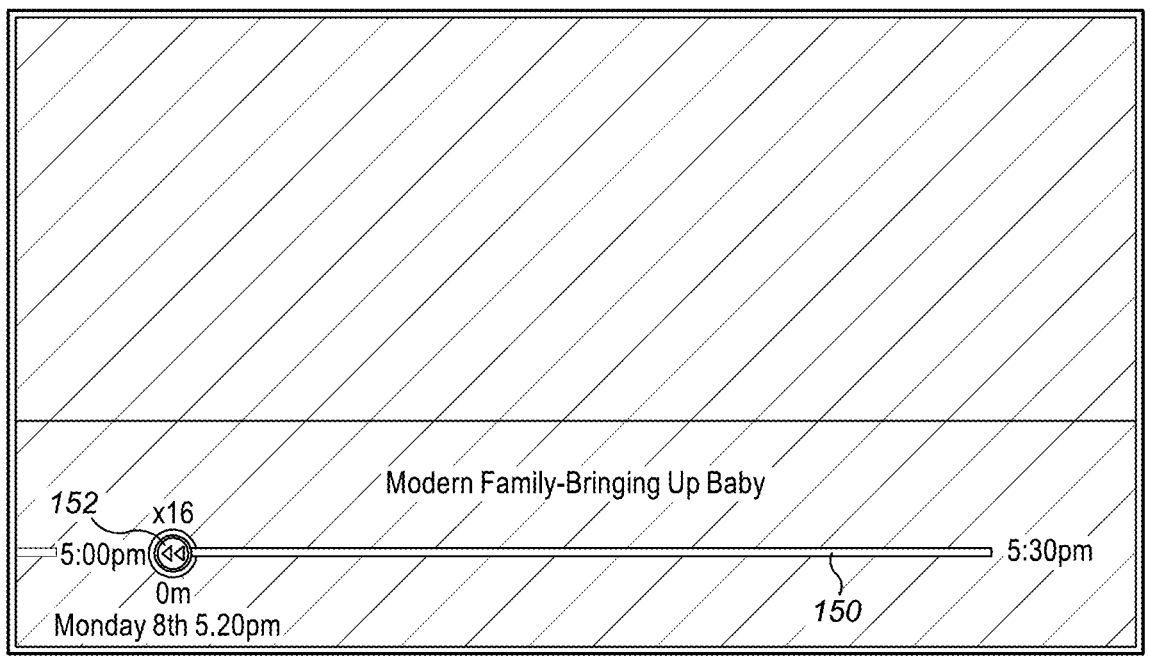

FIG. 13*a* shows the current programme being viewed live. The user then changes the viewing mode to rewind, as 16× speed, to take the viewing point back to the beginning of the current programme, broadcast at 5 pm, as shown in FIG. 13*b*.

Figure 13C:
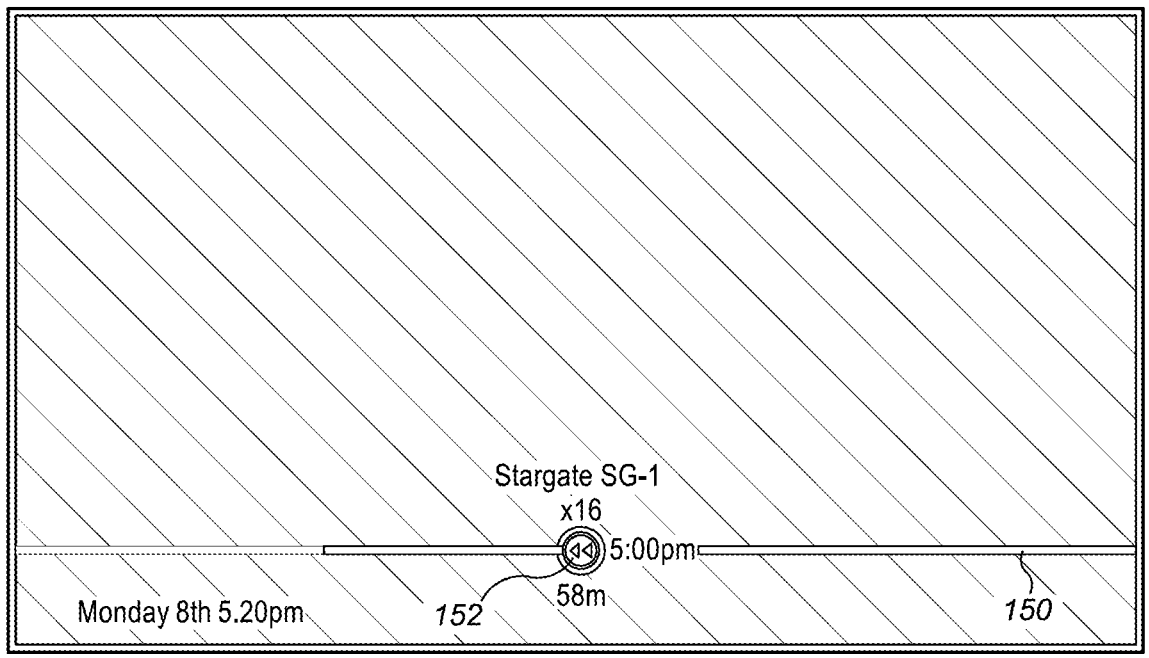
Figure 13D:
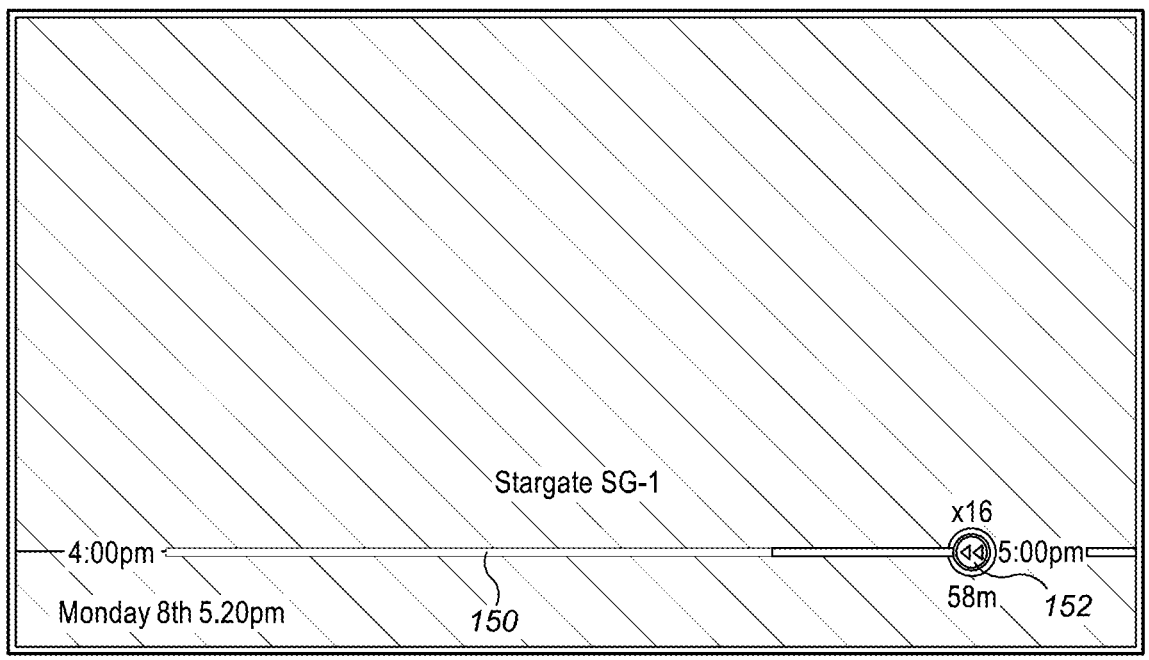

When the viewing point is moved back before the beginning of the current programme, as shown in FIGS. 13*c* and 13*d*, an animation effect shows the progress bar 150 sliding to the right so that the end time of the previous programme is now at the right hand side of the progress bar 150. This provides an intuitive visual cue that the user has moved to another programme in the review buffer. The user may then rewind back to the beginning of the review buffer, as indicated by the left hand end of the highlighted section. Alternatively, the user may fast forward back to the current programme; as the viewing point moves to the current programme, the progress bar appears to slide to the left using a similar animation effect.

EPG Banner

Figure 14A:
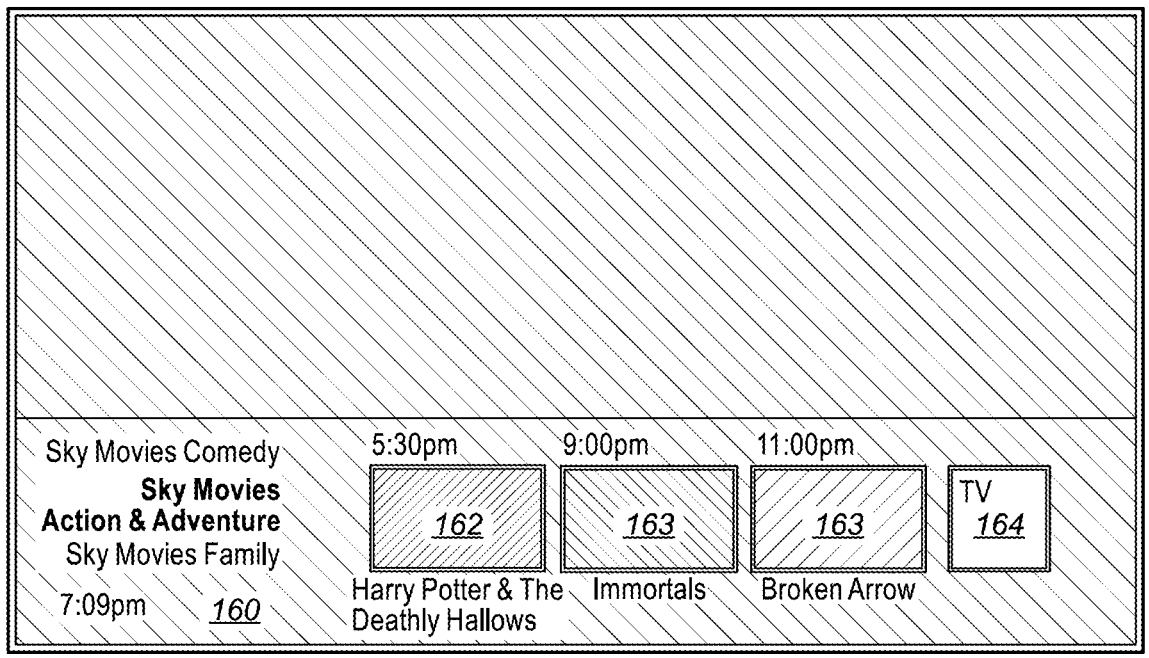
FIGS. 14a to 14c are screenshots showing a mini-EPG display.
Figure 14B:
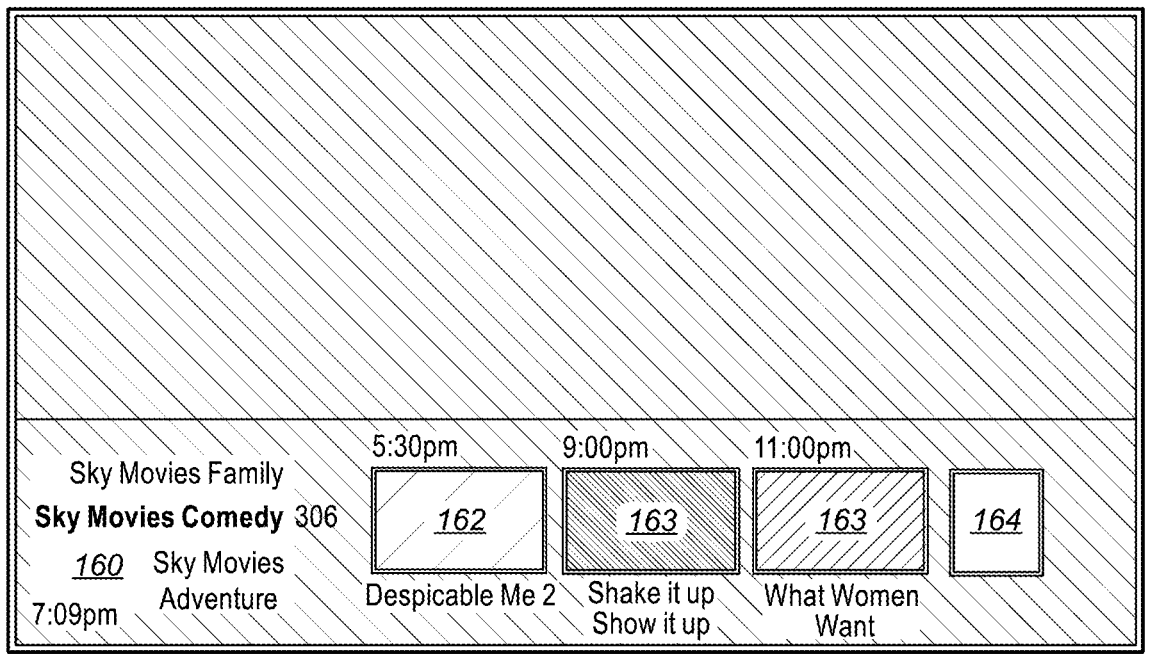
Figure 14C:
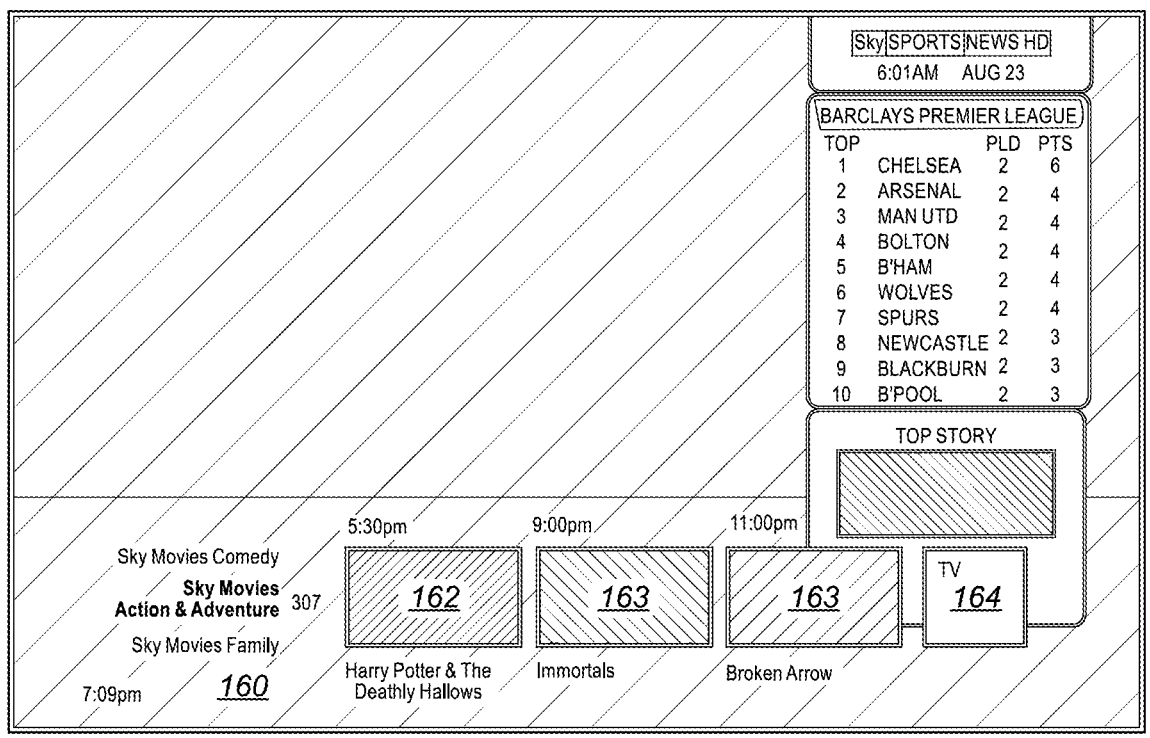

While viewing a programme, a user may issue a command to display a EPG banner 160 across the bottom of the screen, as shown in FIGS. 14*a* to 14*c*. The left hand side of the banner 160 shows the selected channel name and number, with the names of the immediately preceding and following channels on a channel list shown respectively above and below.

Current and following programmes in the selected channel are indicated visually and in sequence along the banner 160, with the programme titles and start times. The current programme is shown as a live feed in a mini TV window 162. The following programmes in the selected channel are shown as still images. When one of these images is select, programme synopsis information may be displayed, together with a menu option to record the programme.

The user may watch a channel in full screen while watching another channel in the mini TV window 162, by selecting that channel in the EPG banner 160. At least one tuner 10 is dedicated to the EPG banner 160 so that it is always available to provide the live feed in the mini TV window 162.

As shown in FIGS. 14*a* and 14*b*, the EPG banner 160 is normally displayed with a semi-transparent background so that as much as possible of the programme being shown in full screen can be seen. However, channels dedicated to news and sport for example may carry programming with information banners, such as news or stock tickers, at the bottom of the screen. These in-programme banners may show through the superimposed EPG banner 160, giving a cluttered and possible illegible appearance. To avoid this problem, the receiver stores a predetermined list of channels likely to contain in-programme banners, and applies a higher opacity to the EPG banner 160 when superimposed on a full-screen display of a channel in the predetermined list, as shown for example in FIG. 14*c*.

The right hand side of the EPG banner contains a 'TV Guide' menu option 164 which, if selected, brings up a full-screen EPG display, for example as described above.

Gesture Style Sheets

As will be appreciated from the above description, the response of the user interface to different gestures depends on the UI object with which the user is currently interacting, dependent on one or more parameters. On the one hand, it is desirable to create a consistent overall feel to the user interface, but on the other hand it is desirable to modify the interaction behaviour for specific objects. For testing purposes, it may be desirable to quickly change the overall feel, for example in response to user testing, or to change only the response of a specific UI object. It may also be desirable to allow the user to change at least some global settings, according to user preference.

To address one or more of the above problems, the response to the user interface to different gestures is defined by a set of cascaded style sheets defining, for example:

Global Gesture settings, defining parameters for all gestures, such as the zone A within which small, involuntary gestures are ignored, and whether specific types of gesture are enabled;

Specific Gesture settings, which inherit the Global Gesture Settings and further define parameters for specific gestures, such as the interpolation parameters and the snap threshold Gadget settings, which define gestures that may be used with specific UI objects or gadgets (such as vertical/horizontal, slide/swipe) and further define parameters for those gestures when applied to the specific UI objects or gadgets; for example, whether 'snap' action is allowed for that gadget.

Spotlight settings, which define parameters of the spotlight S when interacting with specific gadgets The cascaded style sheets may be formatted in JSON (JavaScript Object Notation), and are accessed by the UI components 142, RCU driver 50 and/or middleware 52. The style sheets may be modified either remotely e.g. via an update over the network 60, or by the user. Preferably, the user does not access the style sheets directly, but may select from one of a plurality of different overall styles configured for different user types e.g. basic or advanced.

Further Alternative Embodiments

The embodiments described above are illustrative of rather than limiting to the present invention. Alternative embodiments apparent on reading the above description may nevertheless fall within the scope of the invention.

In the embodiments described above, specific examples are provided of the various separate display screens of the EPG. As those skilled in the art will appreciate, many specific details of the illustrated screens are provided merely by way of example The above embodiments are presented as separate embodiments but those skilled in the art will appreciate that any combination of the display screens and aspects therein described in the above embodiments and alternatives is possible.

The invention claimed is:

1. A method of providing an interactive user interface for a television display, responsive to a user-operated remote control, the method comprising:
    displaying a plurality of programme items in a two-dimensional grid in which programme items are arranged horizontally by broadcast time and vertically by channel, together with a position indicator, wherein the grid scrolls in a horizontal direction relative to the display while maintaining the position indicator at a fixed horizontal position relative to the display, in response to a horizontal scroll command on the remote control, until the scrolling of the grid reaches a time boundary of the programme items, where the position indicator moves in response to the horizontal scroll command in said horizontal direction relative to the display in order to reach a programme item past the fixed horizontal position while the grid remains stationary,
    wherein the time boundary is at a final broadcast time of available program items contained in the plurality of programme items.

2. The method of claim 1, wherein the grid is scrolled in a vertical direction in response to a vertical direction command from a user, while maintaining the vertical position of the position indicator.

3. The method of claim 2, wherein the vertical position of the position indicator is maintained fixed relative to the display.

4. The method of claim 1, wherein the position indicator highlights a selected one of the programme items.

5. The method of claim 1, wherein the time boundary is defined relative to the current time.

6. The method of claim 1, wherein the time boundary is defined by the limit of available programme data.

7. Apparatus for providing an interactive user interface for a television display, responsive to a user-operated remote control, comprising:
    at least one non-transitory storage medium to store executable instructions; and
    at least one processor to execute the executable instructions configured to display a plurality of programme items in a two-dimensional grid in which programme items are arranged horizontally by broadcast time and vertically by channel, together with a position indicator, wherein the grid scrolls in a horizontal direction relative to the display while maintaining the position indicator at a fixed horizontal position relative to the display, in response to a horizontal scroll command on the remote control, until the scrolling of the grid reaches a time boundary of the programme items, where the position indicator moves in response to the horizontal scroll command in said horizontal direction relative to the display in order to reach a programme item past the fixed horizontal position while the grid remains stationary,
    wherein the time boundary is at a final available broadcast time contained in the plurality of programme items.

8. A non-transitory computer program product configured to store executable instructions that cause one or more processors to provide an interactive user interface for a television display, responsive to a user-operated remote control, by:
    displaying a plurality of programme items in a two-dimensional grid in which programme items are arranged horizontally by broadcast time and vertically by channel, together with a position indicator, wherein the grid scrolls in a horizontal direction relative to the display while maintaining the position indicator at a fixed horizontal position relative to the display, in response to a horizontal scroll command on the remote control, until the scrolling of the grid reaches a time boundary of the programme items, where the position indicator moves in response to the horizontal scroll command in said horizontal direction relative to the display in order to reach a programme item past the fixed horizontal position while the grid remains stationary,
    wherein the time boundary is at a final available broadcast time contained in the plurality of programme items.

* * * * *